Sept. 7, 1965     H. L. McWHORTER ETAL     3,204,291
APPARATUS FOR EXTRUDING A THERMOPLASTIC MATERIAL
Filed Nov. 6, 1962                                      6 Sheets-Sheet 4
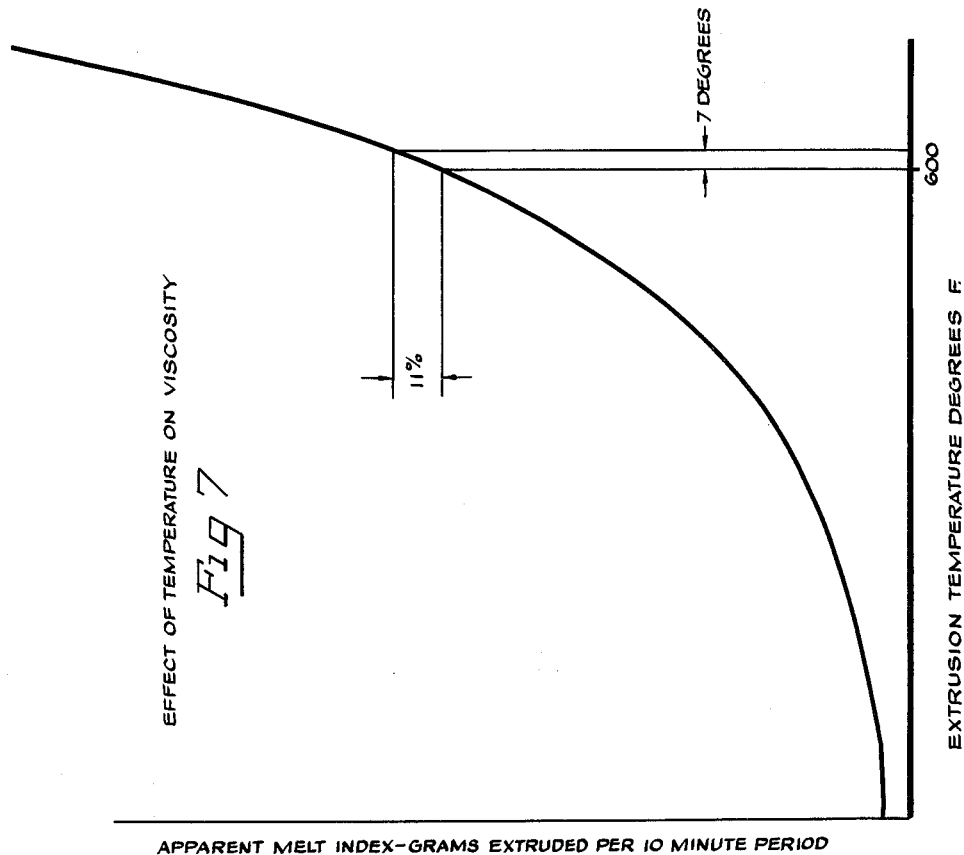
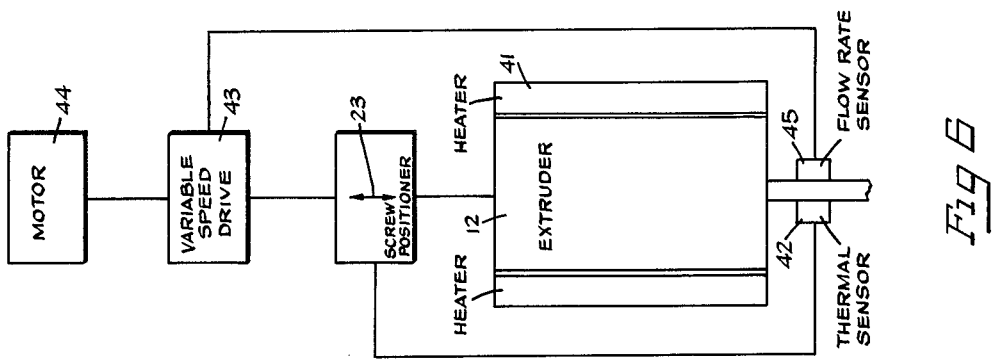
INVENTORS
Henry L. McWhorter
BY Daniel G. Jocz
ATTORNEYS

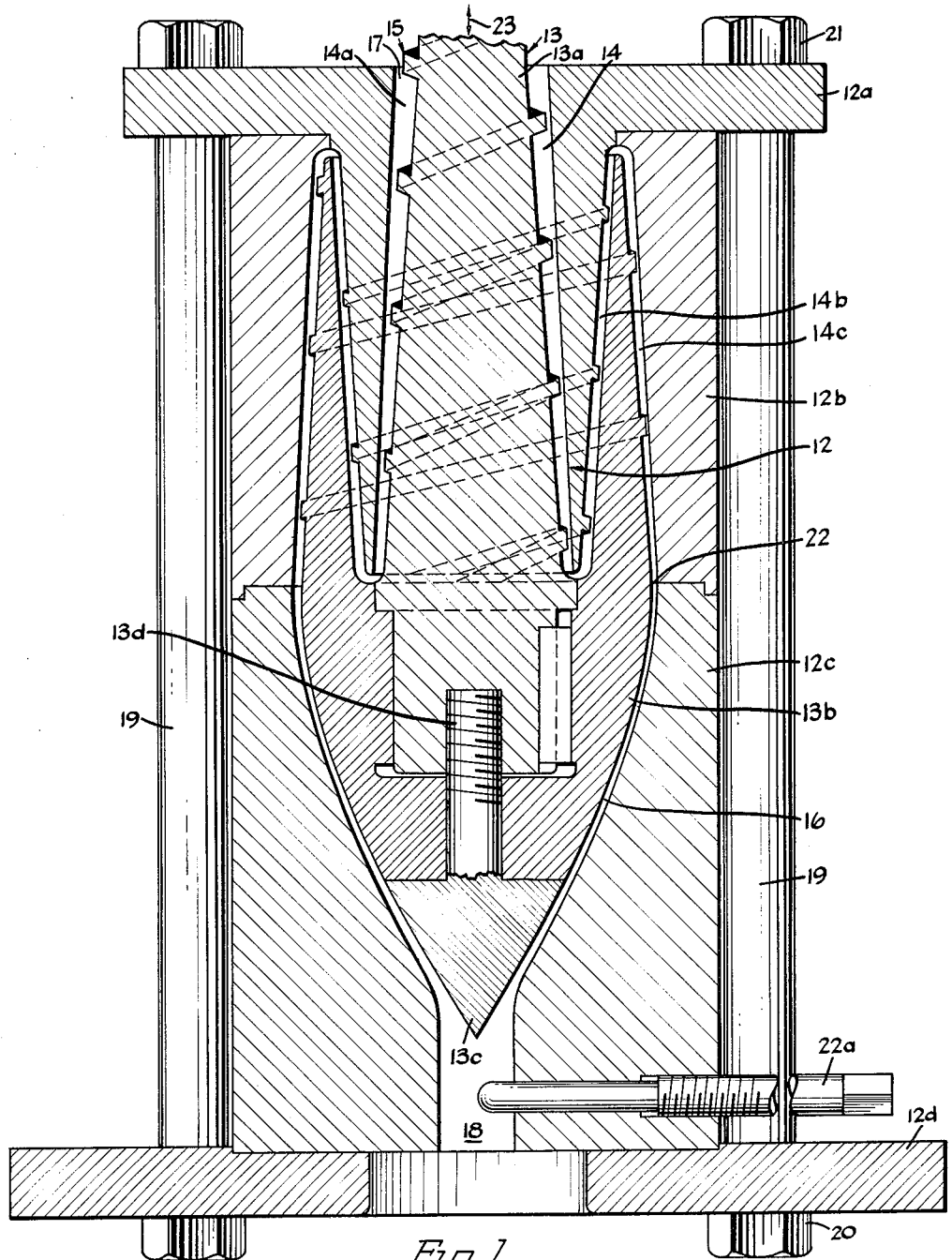

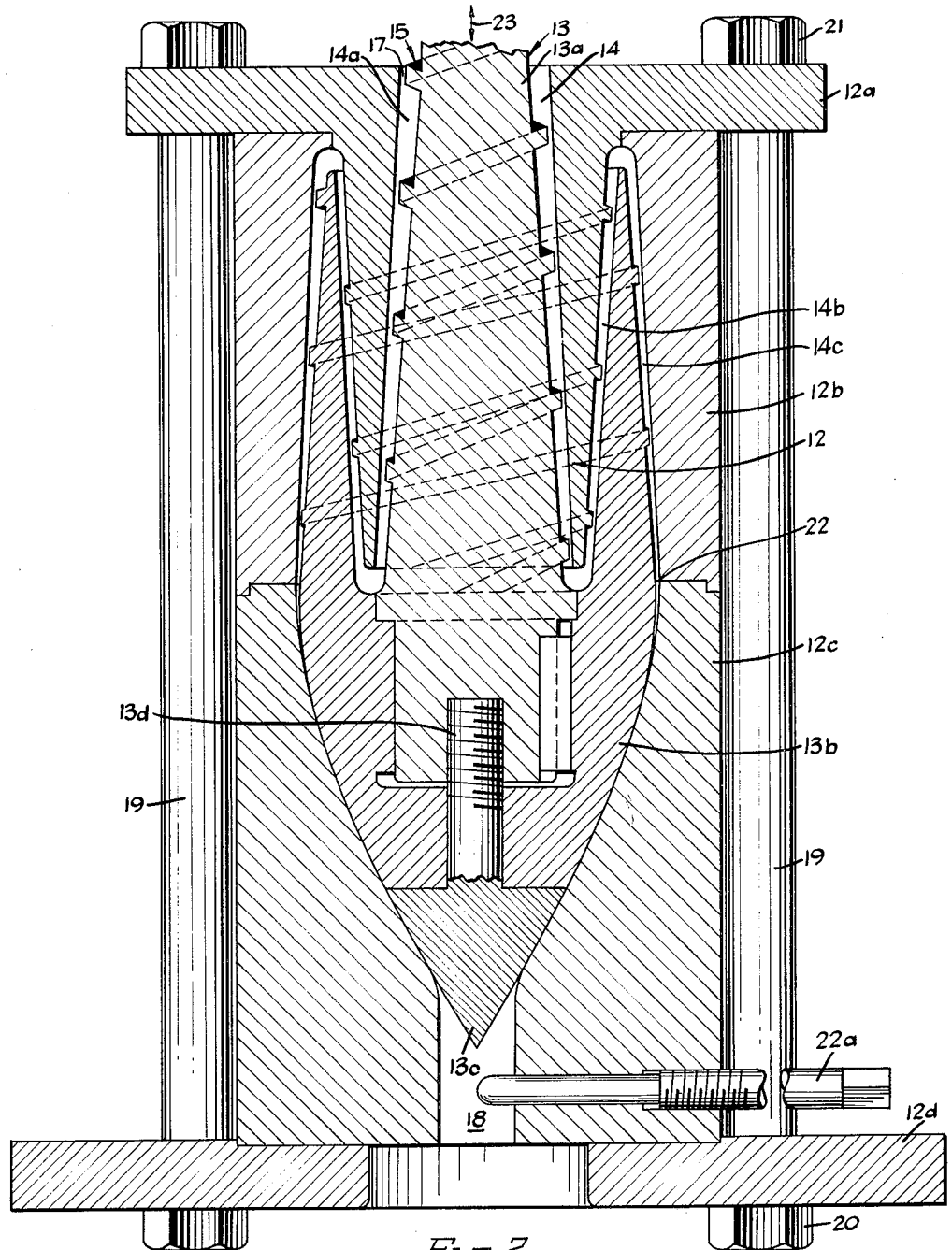

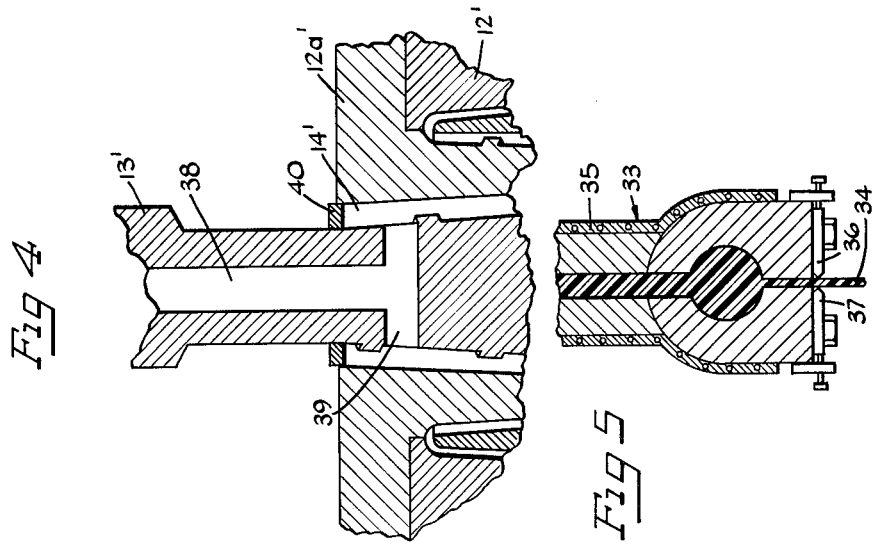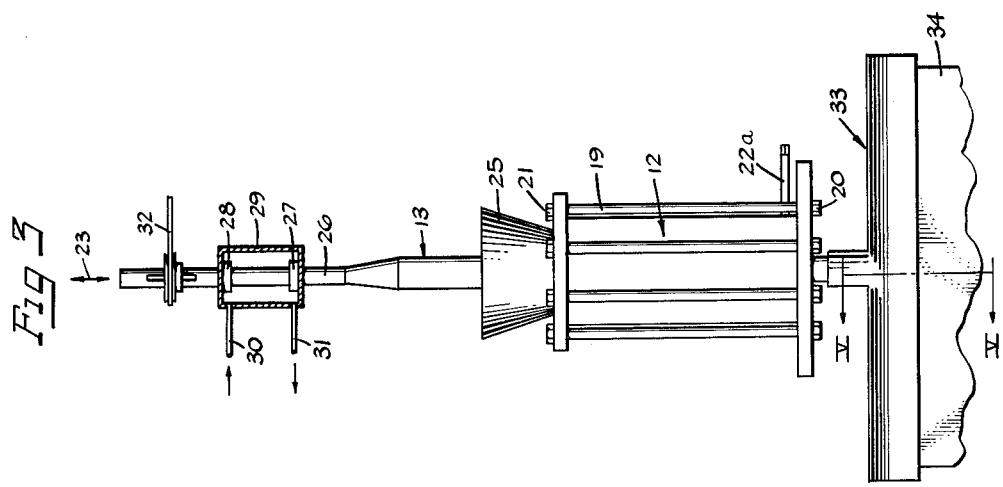

ADIABATIC EXTRUSION OF POLYETHYLENE

TEMPERATURE DISPLACEMENT PROFILES

INVENTORS
Henry L. M<sup>c</sup>Whorter
Daniel G. Jocz

Sept. 7, 1965 H. L. McWHORTER ETAL 3,204,291
APPARATUS FOR EXTRUDING A THERMOPLASTIC MATERIAL
Filed Nov. 6, 1962 6 Sheets-Sheet 6

POWER AND HEAT
VS.
TEMPERATURE
FOR
POLYETHYLENE

ADIABATIC EXTRUSION
OF POLYETHYLENE

INVENTORS
Henry L. McWhorter
BY Daniel G. Jocz
ATTORNEYS

United States Patent Office 3,204,291
Patented Sept. 7, 1965

3,204,291
APPARATUS FOR EXTRUDING A THERMO-
PLASTIC MATERIAL
Henry L. McWhorter and Daniel G. Jocz, Beloit, Wis., assignors to Beloit Corporation, Beloit, Wis., a corporation of Wisconsin
Filed Nov. 6, 1962, Ser. No. 235,679
7 Claims. (Cl. 18—12)

The present invention relates to improvements in mechanism for extruding thermoplastic materials and particularly to a mechanism which will advance and plasticate material in an adiabatic operation and which comprises first and second relatively coaxially rotatable members, surfaces of revolution on the members facing each other to define an annular passage in which the thermoplastic material is advanced and plasticated, the passage having a first portion extending in a first axial direction and having a succeeding second portion extending in the opposite axial direction, the passage having a further succeeding third portion extending in the first axial direction, and raised helical material advancing elements on at least one of the surfaces for advancing the thermoplastic material along the passage.

A plastic extruder for delivering fluid plastic material to a die may be expected to deliver a thermally homogeneous melt at a uniform high rate with pulse free delivery. The extruded plastic is employed in the production of plastic films, pipes, sheet profiles, coatings on wire, paper and other uses. The general type of extruder of the art to which the present invention pertains is embodied in a screw rotating in a barrel which has a hardened liner with the screw being power driven and plastic granules fed from a hopper into the channel of the screw. The screw advances the plastic granules which are worked as they are advanced through the barrel, and the extruder must function to obtain adequate mixing of the plastic material and work the material. The heat of working in the general type of extruders available may or may not be supplemented by heaters on the barrel to plasticate the material.

In the melt-extrusion operation, the relative motion between the screw and the barrel wall causes shearing of the material in the screw channel and the power consumed in the shearing of the polymer is converted into heat and contributes to the temperature rise of the plastic resin. The amount of heat generated is a function of the shallowness of the screw channel and the screw speed relative to the barrel wall. By blocking the delivery of the extruder the output per turn of the screw will be reduced and this consequently exposes the plastic to a greater amount of shear and increases the temperature from heat generated through mechanical working. There is an important interrelationship between the foregoing extrusion variables of screw channel depth, speed and resistance to delivery which have a definite effect on the successful operation of the screw extruder.

With restricted output the temperature will increase and the viscosity will decrease so that heat will decrease. The futility of attempting to obtain temperature control (at high temperatures) by using a restricted delivery (i.e., high pressure) can be illustrated with the following example:

Compute the pressure required to extrude polyethylene at 650° F.:

1#=30 cu. in.
1# at 650° F.=450 B.t.u. (see FIG. 10)
450 B.t.u.×778 ft. #/B.t.u.=350,000 ft. #
30 cu. in. 2.5 ft. x 1 sq. in.
350,000 ft. #÷2.5 ft.=140,000 lbs. on the sq. in.=p.s.i.

Hence, adiabatic extrusion cannot be achieved by pressure only and impossibly high pressures are required to do any good.

One of the problems which occurs with improper relationship between the variables is known as surging. This creates pulsations in the delivery of the plastic and unsatisfactory operation. This may occur when the metering section (the last section of a typical single screw extruder) tends to run starved because the capacity of the feed and transition zones (the first parts of the screw extruder) to deliver melted polymer may be less than the pumping capacity of the metering section. However, normally a conventional isothermic extruder only runs starved when adiabatic operation is attempted by increasing screw speed. Change in speeds of rotation of the screw may change the heat generated in the working section at a rate disproportional to the change in rate of feed of the feeding section so that surging and uneven extrusion may result. Also inadequate mixing or incomplete plasticating may result. Attempts have been made to improve the operation of extruders by providing screw threads of different characteristics in the metering section than in the feed section. The characteristics are expensive to construct requiring complex machining operations.

It has also become necessary to provide very long screws and barrels so that a considerable amount of space is required, the amount of drive torque becomes large for an elongated screw resulting in high torsional stresses, and bending stresses occur with sagging of the screw due to the weight. The long screw scrapes the barrel wall requiring special hardening of the screw flights and requiring a liner for the barrel wall. The elongated screw results in heat losses which contribute to temperature instability, surging and unwieldy operation. The long lengths also usually require that the screws be operated in a horizontal position.

In the present invention the device is deliberately made inefficient as a pump. The term efficiency is not, however, well defined in extrusion of plastics.

The following comparisons may be made of different extruders:

A. Conventional extruder

Drive torque is proportional to the 1.4 power of speed. Conventional extruders have high drive torques because of their ratio $L/D$. They operate near their ultimate torsional strength. This resultant low speed limitation puts a definite limitation on the power input of conventional extruders and they must use external heat to achieve increased throughput.

B. Conventional extruder operated adiabatically

In a few instances conventional extruders have operated adiabatically by metering the input of polyethylene. This means that they are purposely run starved. They are run at high speeds. The unmelted pellets come frighteningly close to the output. The output temperature is determined by the design geometry and wear. The operator has no control.

C. The present invention

This invention permits the operator to select and control a wide range of output rates and output temperatures within the speed and power limitations of the drive. Maximum possible mixing occurs because all power input goes into the polyethylene. There is no surging (like B above) the heat flow is not axial (as B above) but is radial due to the folded feature (as will later appear more clear.) This keeps the unmelted pellets a long distance from the output. The mixing which takes place in this long distance is what permits obtaining high temperatures and temperature control in the output and is an important feature of the present invention.

It is accordingly an object of the present invention to provide an improved screw type extruder which competently plasticates the material accomplishing a complete mixing and working, and which avoids non-uniform delivery of plastic and particularly avoids surging.

A still further object of the invention is to provide an adiabatic plastic extruder which incorporates a pumping power (the proportion of input power for advancing the plastic) to mixing power (the proportion of input power for mixing and working the plastic) ratio adjustment to achieve ideal mixing.

A further object of the invention is to provide an improved high speed plastic delivery screw and barrel capable of adiabatically heating the plastic without requiring the provision of a long screw and the accompanying disadvantages of high torsional stresses at high speed, and without requiring the special hardening of the screw advancing flights and without requiring a liner for the barrel, and avoiding the disadvantages of sagging of the screw due to weight with scraping of the barrel surface.

A further object of the invention is to provide an improved plastic extruding screw wherein the helix or pitch angle of the advancing threads decreases toward the delivery end for more effective working of the plastic without encountering the expense of machining a special thread wherein the machining tool must advance at a decreasing rate to change the helix angle of the thread.

A still further object of the invention is the provision of a screw extruder wherein the shear on the plastic inherently increases as the plastic becomes less viscous because the relative speeds of the surfaces increase, and adequate work is done on the plastic for heating the plastic in an exceedingly short time and achieving a high output rate in a reasonable length of axial travel.

A still further object of the invention is to provide a screw type plastic extruder which fully adiabatically heats the plastic avoiding the need of auxiliary heaters or coolers during normal running and has temperature stability and improved control and wherein temperature surges and resultant viscosity surges are avoided.

A still further object of the invention is to provide a single screw type extruder which employs a path of travel which axially doubles back on itself in a telescope fold to avoid the expense of a long barrel, which accomplishes dynamic temperature stability, which avoids sagging due to weight, which is very short and well adapted to operating in a vertical position, and which is capable of absorbing a lot of horsepower in a limited space.

Other objects, advantages and features will become more apparent with the teaching of the principles of the invention in connection with the disclosure of the preferred embodiments thereof in the specification, claims and drawings, in which:

FIGURE 1 is a detailed sectional view taken through an extruder mechanism constructed and operating in accordance with the principles of the present invention;

FIGURE 2 is a sectional view similar to FIGURE 1 and showing the extruder screw in a closed position wherein the flow of plastic is fully throttled;

FIGURE 3 is an elevational view shown in somewhat schematic form of an overall extrusion mechanism;

FIGURE 4 is a fragmentary detailed sectional view of the feed end of the extruder mechanism;

FIGURE 5 is an enlarged fragmentary sectional view taken substantially along line V—V of FIGURE 3 and illustrating a form of extrusion die;

FIGURE 6 is a diagrammatic view of the extruder including control mechanism;

FIGURE 7 is a graph showing polyethylene material extruded plotted against temperature in a melt index measuring device;

On the drawings:

Figure 8:
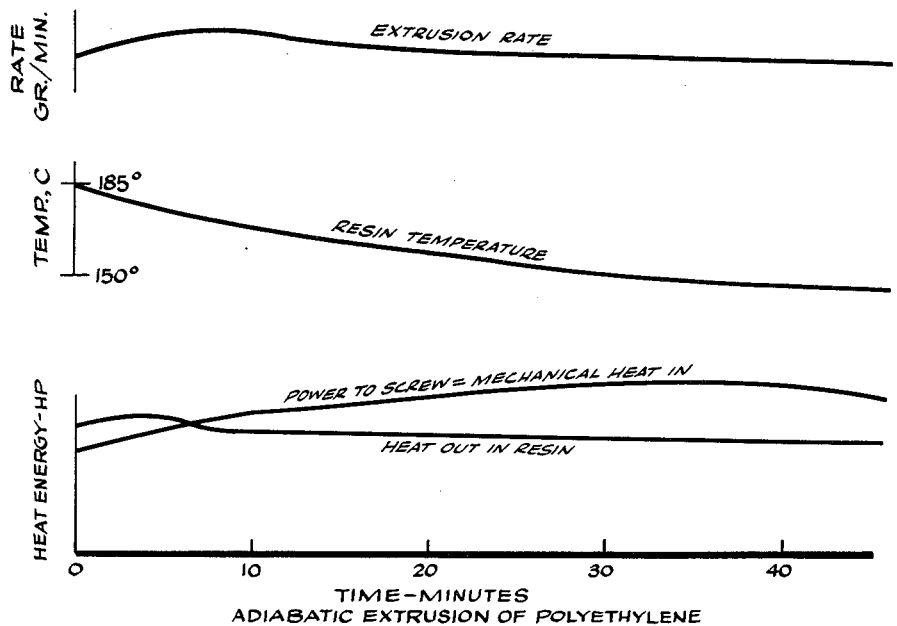
FIGURE 8 are graphs plotting extrusion rate, temperature of plastic and heat energy against time, after external heaters have been shut off in a conventional extruder.
Figure 9:
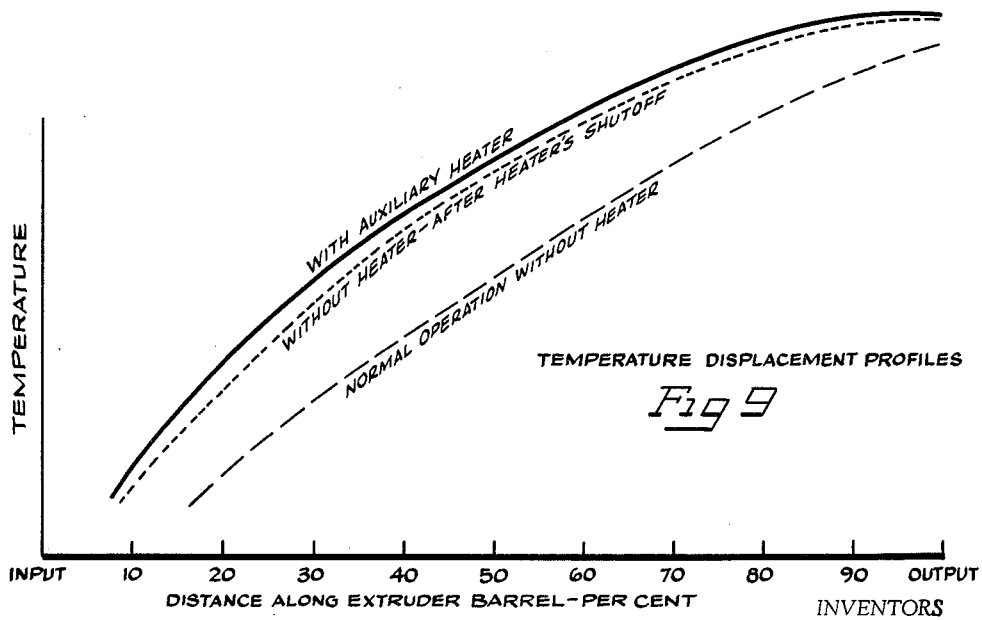
FIGURE 9 is a graph with temperature plotted against a distance of plastic along an extruder barrel for a conventional extruder.

*Conventional extruder operation.*—FIGURES 7, 8 and 9 are included to illustrate in connection with the operation of a conventional extruder of the type heretofore available, the characteristics of operation and the phenomenon of surging.

The "Melt Index" is the amount of material in grams which flows in 10 minutes at a specified pressure through a specified orifice at a temperature of 375° F. FIGURE 7 shows how the flow of material varies with temperature for one kind of polyethylene in a melt index measuring device.

Applying the data of FIGURE 7 to a conventional extruder shows that a 7% increase in temperature at the output orifice would result in an increase of 11% in the extrusion rate. Input energy to the extruder in the form of work (horsepower) is required to pump the volume of the extrudate against extrusion pressures. The pumping power requirement is determined by the volume rate of delivery and pumping pressure. This pumping energy is about 1% of the energy required to heat and melt the plastic which in the present example is polyethylene. The heating energy is derived from frictional losses from pumping and from conduction of the auxiliary electric heaters. The drive motor may supply up to 90% of the heat required with the electric heater supplying the balance.

FIGURE 8 illustrates the change in output and temperature of the extrudate after the auxiliary heaters were shut off in an extruder that had been operating at 310 grams per minute at 185° centigrade. These graphs illustrate that at the 185° operating temperature the auxiliary heaters must have been supplying a fairly large proportion of the heat to the plastic, possibly on the order of 25%. In other words for operation at 185°, this extruder design is so efficient as a pump that appreciable extra heat must be added to supplement the frictional heat.

As will be noted from the intermediate graph the temperature appears to become asymptotic to 150°. This indicates that this extruder design is such that its pumping rate and frictional heat are in balance at 150° for the particular plastic being run.

As will be noted from the upper graph, as compared with the intermediate graph, as the temperature initially dropped the extrusion rate increased.

FIGURE 9 will aid in illustrating why the output of an extruder increases temporarily when the auxiliary heaters are discontinued. The solid curve of FIGURE 9 represents the temperature of the plastic along the length of the barrel and it is to be noted that the curve is convex.

Material continues to move through the barrel after the auxiliary heaters are shut off. The line consisting of short dots represents the temperature of the same particles as were measured in the solid line, a short time after the heat is shut off. The temperatures of the particles has not had time to change but their position is changed.

The temperature at the output orifice has not changed, but the temperature all along the barrel length (the pumping section) has decreased. This decrease in temperature is accompanied by an increase in viscosity. The increase in viscosity tends to cause an increase in pressure. The constant temperature material at the output orifice responds to the increase in pressure by an increased rate of flow. This increased flow continues until hot material at the orifice is replaced by the cooler material. The cooler material under normal operation is illustrated by the lower dash lines. The cooler material at the orifice offers more resistance to extrusion so that the extrusion rate eventually decreases as shown by the top graph in FIGURE 8.

The operation of the auxiliary heaters is controlled by thermostatic devices measuring the temperature of the extrudate at the output orifice and the barrel at various points along the barrel.

As an example of a complete "cycle" of operation of a conventional extruder which utilizes thermostatically controlled auxiliary heaters, and wherein surging occurs, assume that first of all the auxiliary heaters are operated by the thermostat as a result of the cooling off of the extrudate, and that the temperature of the extrudate at the outlet of the barrel is increased about 7 degrees before the thermostat disconnects the heaters.

After the heaters are turned off, the extrusion rate at the output will temporarily increase about 11 percent as a result of the temperature drop of the barrel, with the exception of the outlet thereof, and as a result of a corresponding increase in viscosity and therefore in pressure of the extrudate. Consequently the temperature position relationship of the polyethylene in the extruder barrel temporarily shifts from the solid line of FIGURE 9 to the short dotted line.

After the temperature of the various heat zones of the barrel have dropped several degrees, the thermostat again connects the heaters. Since polyethylene is a poor conductor, however, and since the extrusion rate is still high, the heaters cannot immediately cope with the temperature drop and the temperature will therefore continue to drop.

Finally, after cooler extrudate reaches the barrel outlet, the extrusion rate will begin to decrease. The temperature position relationship of the extrudate in the barrel at this joint in time has shifted to the long dashed curve of FIGURE 9. It is assumed in this example that by the time the temperature of the various heat zones of the barrel have stopped dropping that there has been about a 7 degree temperature decrease from the temperature which obtained when the heaters were previously disconnected.

Now, as a result of the lower extrusion rate, the heaters are more effective. The temperature of the extrudate will begin to rise. Assume the heaters will again be disconnected by the thermostat after the temperature has risen about 7 degrees, whereupon the temperature position relationship of the extrudate in the barrel has again shifted back to the solid line of FIGURE 9.

Now the thermostats will again disconnect the heaters, and the cycle repeats itself, with a repeated surging or increase and decrease in the extrusion rate, at the output of the barrel, of about 11 percent.

The trend has been to increase the length/diameter ratio of extruders to reduce surging and to increase mixing, and this has made extruders expensive to construct, and has caused the requirements of construction which are above set forth.

The amount of mixing an extrudate has received could be measured as the heat in the extrudate minus the heat added by conduction. Therefore better mixing is achieved when all of the heat in the output is derived from the mixing power. To accomplish this satisfactorily it is necessary to control the ratio of the pumping power to the mixing power. If the pumping power to mixing power ratio is too large, heat must be added to achieve the desired output temperature, and this is usually the case. If the pumping power to mixing power ratio is too small the barrel must be cooled to prevent exceeding the desired extruding temperature.

*Extruder of present invention.*—Accordingly the present invention features an extruder which is dynamically stable and is free of surging and has a low length to diameter ratio. The invention further features a pumping power to mixing power adjustment to achieve ideal mixing without requiring extrinsic heating or cooling apparatus.

As shown in FIGURES 1 and 2, the extruder includes a barrel 12 which is hollowed to form a chamber therein and a relatively rotating screw 13 is positioned within the barrel chamber. The screw 13 has surfaces of revolution which face the surfaces of revolution of the chamber wall of the barrel so as to define a passage 14 through the extruder in which plastic material is advanced and worked.

The passage 14 includes a first axially extending portion 14a and a second portion 14b which axially doubles back on the first portion 14a to extend in an opposite axial direction. The passage 14 further includes a third portion 14c which is formed by the passage again axially doubling back on itself to extend in the first axial direction. The passage 14 with the first portion 14a, the second portion 14b and the third portion 14c thus extends radially outwardly and axially reverses itself to substantially define a Z-shaped path.

The surfaces of revolution of the barrel 12 and screw 13, which face each other to define the portions of the passage are sections of truncated cones, instead of cylindrical sections. The annular length of the passage is increased for each portion, and the passage continually increases in annular length, or in other words in diameter, along each portion of the passage 14.

The first, second and third portions of the passage 14 provide an advancing and working portion of the overall passage, and the remainder of the passage provides a metering portion 16. The metering portion generally begins at location 22, FIGURE 1, and extends down along the tapered portion of the screw.

The surfaces of revolution of the screw 13 and the chamber of the barrel 12 are each arcuately tapered inwardly toward a barrel discharge 18 with the barrel inlet shown at 17. The metering portion 16 of the passage is shaped so that the passage space between the barrel 12 and screw 13 provides an area of constant cross section. To obtain this area the screw and barrel surfaces are formed in accordance with the relationship:

$$y = \frac{x}{2}\sqrt{\frac{4\pi^2 k^2 x^2 - 1}{A^2}} - \frac{A}{4\pi k}\log_e\left[\frac{2\pi k x}{A} + \sqrt{\frac{4\pi^2 k^2 x^2 - 1}{A^2}}\right]$$

wherein:

y is the vertical coordinate along the screw axis, x is the horizontal coordinate radially outwardly from the axis, k is distance screw must move to close the metering section (varies), A is the area at point 18. It is also the area of the flow path at any point along section 16 when the screw 13 is at the upper limit of its stroke. This area of the flow path has the shape of the frustum of a cone with the surface of the cone perpendicular to the surfaces of the parts 12c and 12b at each point along the path 16, $\log_e$ = natural log with base e.

Along the working portion of the passage 14 one of the surfaces of revolution of the barrel 12 or screw 13 are provided with plastic material advancing elements or threads 15. For the first portion 14a these threads are on the screw 13.

For the second portion 14b of the passage the threads 15 are formed on the barrel 12. For the third portion 14c of the passage the threads are formed on the screw 13B.

As indicated by the arrowed line 23, the screw 13 is axially adjustable relative to the barrel 12. The ratio of pumping power (the power input to the screw required for advancing plastic material along the path 14) to mixing power (the power required for shearing the plastic in the passage 14) can be controlled by the position of the tapered screw 13 within the barrel 12. With the screw in its uppermost position the clearance space between the screw lands 15 and the barrel is a minimum. Therefore the material by-passing the lands is a minimum, so pumping becomes most efficient.

Lowering the screw 13 increases the clearance between the lands and the barrel. Proportionally the clearance between the land and barrel increases much faster than the space between the grooves (the area between the lands) and the barrel. This causes the pumping rate to decrease faster than the mixing torque decreases. The mixing torque is of course a function of the space between the grooves and the opposite surface of revolution. The result is that less material would be extruded, but at a higher temperature.

If the screw speed is then increased to restore the extruder to its original output rate, the temperature of the extrudate will be further increased, since horse power input increases with the 1.4th power of the screw speed, and output increases linearly with speed.

In order to further increase the change in pumping power to mixing power ratio, the bottom tip of the screw is shaped to act as a needle valve against the barrel 12c. Lowering the screw thus throttles the output while also reducing the effectiveness of the screw as a pump.

In the present arrangement inexpensive cyanide hardening of the screw and barrel chamber wall may be provided. This permits the outer surfaces of the lands to be ground with relief similar to sharpening a cutting reamer to be run in the reverse direction. The bores in the barrel can be honed with the mating piece. This provides a fit wherein the resulting wedge of extrudate will perform similar to a lubricating oil wedge and give positional stability to the screw and prevent scoring due to heat distortion or due to inadvertently running the screw too far into the barrel.

The path of the extrudate going through the extruder passage 14 is folded upon itself twice. This provides a path of travel of adequate length for working the extrudate without requiring providing a long screw and a long barrel wherein the screw would have to be hardened by an expensive hardening process and the barrel would have to be lined. If a tapered long barrel were employed this would be expensive to bore whereas in the present arrangement three short tapered bores, all at the same angle, can be easily machined by setting the cross slide of a lathe at the desired angle.

The present arrangement also obtains dynamic temperature stability which eliminates surging. If the temperature at point 22 (which is just prior to the metering portion 16) tends to increase (which is the beginning of surging as set forth above) the heat will feed back into the "pumping section," which is the early part of the passage 14b, so that the viscosity in the pumping section is directly controlled by, and has a fixed relation to, the output temperature.

A long screw will sag due to its own weight which causes the screw to rub against the barrel bore whereas the short screw construction in the instant design does not deflect enough to permit the screw to continually scrape against the barrel.

The barrel 12 is illustrated as being formed of an upper part 12a which is annular in shape and has a downwardly projecting portion to provide the surfaces of the first portion 14a' and second portion 14b of the passage 14. The barrel includes a next part 12b which is generally cylindrical in shape with respect to its outer surface, and the inner surface provides a wall of the third portion 14c of the passage. The barrel includes a third part 12c which provides a surface of the metering portion of the passage. A plate 12d is positioned below the part 12c of the barrel, and axially extending circumferentially spaced tie rods 19 extend through holes in the parts 12a and 12d and nuts 20 and 21 are threaded onto the ends of the bolts to clamp the barrel parts firmly together.

The screw 13 is constructed of a first part 13a which provides the inner surface of the first portion 14a of the passage, of a second part 13b which provides the outer surface of revolution for the second portion of 14b of the passage and which provides the inner surface of revolution for the third portion 14c of the passage. The parts are held together by a nose tip 13c which has a threaded stud 13d screwed into the first part 13a of the screw.

At the discharge outlet 18 is an auxiliary throttling valve 22a which may be used for certain types of plastic. The barrel 12 and the screw 13 may be designed, for example, for a range of plastics having a certain viscosity after being plasticated and other plastics having viscosities outside of this range will not receive sufficient working by adjustment of the axial position of the screw 13. The screw will then be set to a raised position for accomplishing the desired pumping and throttling will be accomplished by the valve 22a rather than by the metering portion 16 of the passage.

FIGURE 2 illustrates the screw 13 moved down to a closed position where the metering portion 16 of the passage is closed. As the screw 13 is moved toward this position the pumping power to mixing power ratio gradually decreases.

FIGURE 3 illustrates an overall view of an extruder with a die. Plastic is fed into the extruder barrel 12 from a hopper 25 which is open at the top to receive plastic pellets and the pellets flow downwardly into the path 14 of FIGURES 1 and 2.

The screw 13 is driven in rotation by its shaft 26 supported in suitable bearings 27 and 28 which aid in holding the screw coaxial with the chamber of the barrel 12. The bearings are shown enclosed in a housing 29 which is adapted to receive a flow of cooling lubricant through an inlet line 30 and the lubricant is discharged through a line 31. The shaft 26 is controllably axially adjustable by suitable mechanism indicated schematically by the arrowed line 23 and various types of mechanism may be used for this purpose as will be fully appreciated by those skilled in the art and such mechanism need not be shown in detail. The shaft is driven in rotation as shown schematically by a belt and pulley 32.

The extrudate from the extruder flows downwardly into a die 33 which is shown in somewhat greater detail in FIGURE 5. A sheet 34 of plastic is extruded from the die 33 which has a chamber therein leading to a die opening formed between die plates 36 and 37. As will of course be understood the extruder is well adapted to use with dies of various forms for extruding sheets, tubes, wire covering and other forms of plastic extrusion. The die is shown covered with a heater 35 which prevents the cooling of the extrudate in the die after it has left the extruder.

FIGURE 4 illustrates another form of feed arrangement. In the arrangement of FIGURES 1 through 3 the pellets flow directly downwardly into the passage 14. In the arrangement of FIGURE 4 the pellets are fed downwardly through an axially extending feed passage 38 within the upper end of the screw 13. Suitable means such as a hopper is provided for directing the pellets to the passage 38. At the lower end of the passage 38 are radially extending openings 39 which feed into the advancing and working passage 14'. A rotary seal 40 holds the plastic in the passage 14' which leads down within the housing part 12a' and the remaining construction of the extruder, including the barrel 12', is of similar or of the same construction as the extruder of FIGURES 1 and 2.

FIGURE 6 illustrates diagrammatically the control arrangement for the extruder. The extruder will be provided with heaters such as those which are provided for the die 33. The heaters are used for start up and to replace radiation losses, and the heater is shown at 41 in FIGURE 6 surrounding the barrel. The heater has been omitted from the illustrations of FIGURES 1 through 3 for simplicity of illustration. The mechanism 23 for axially shifting the position of the screw 13 can be automatically controlled by output temperature sensing means 42. This will shift the axial position of the screw to maintain a constant temperature of the extrudate coming from the extruder.

The extruder is driven through a variable speed drive 43 by a motor 44 and the drive speed can be automatically controlled by a flow rate sensor 45. Since the output rate is proportional to pressure if the temperature is held constant, the flow rate sensor can operate as a pressure measuring device. Therefore the thermal sensor 42 will maintain the temperature of the extrudate constant and the flow rate sensor 45 will maintain a constant output.

Figure 10:
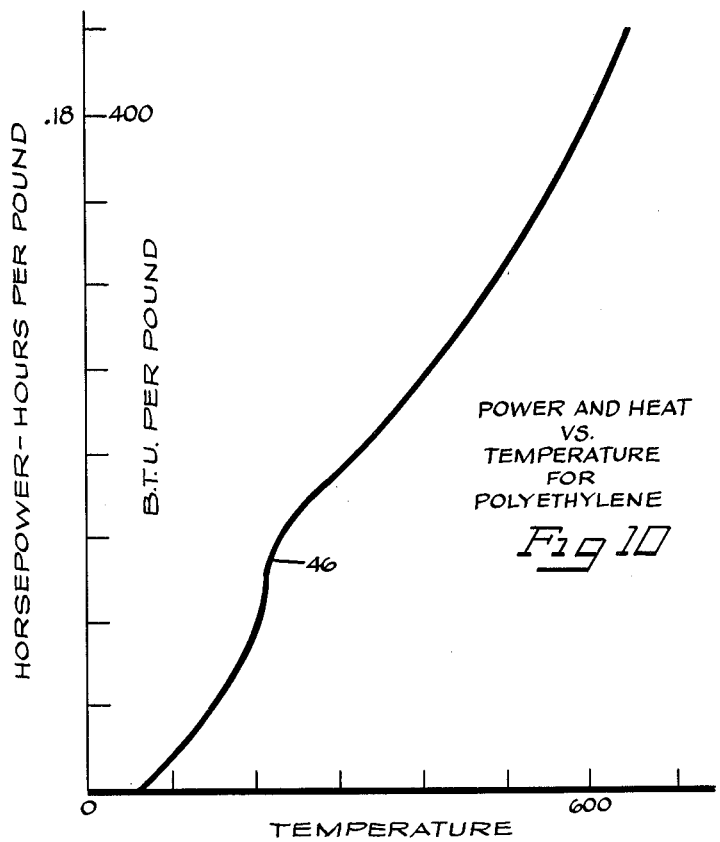
FIGURE 10 is a graph showing horsepower hours or B.t.u. per pound plotted against temperature.

FIGURE 10 illustrates the power and heat input to the extruder, to the temperature of the extrudate, and the straight line portion 46 occurs as the plastic changes from the solid to the fluid state.

Figure 11:
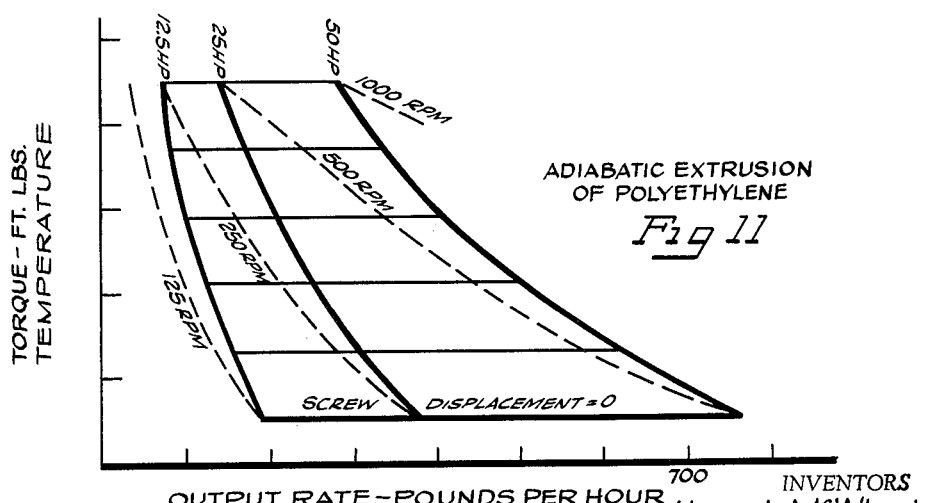
FIGURE 11 is a graph showing temperature or torque plotted against output rate.

FIGURE 11 illustrates the relationship of the temperature of the extrudate, or the torque, to the output rate in pounds per hour for different speeds of the extruder and different horsepower inputs.

Thus it will be seen that we have provided an improved extruder mechanism which provides the objectives and advantages above set forth.

The present structure obtains a high performance low cost extruder and meets the requirements of achieving the ability to absorb a lot of horsepower in a limited space. As the polyethylene progresses through the extruder temperature increases, viscosity decreases, and its ability to absorb energy decreases. With a conventional extruder screw the delivery end is comparatively ineffective. With the present extruder the cold pellets are introduced near the axis of rotation where the surface speed is low. As the pellets melt and further become less viscous they travel a path that progressively increases in radial distance from the center. The surface speed increases and the area exposed to the increase also increases. This compensates for the effect in reduction of viscosity giving the extruder a uniform rate of energy absorption along its folded length. Thus, maximum output is achieved from the metal used in the extruder. The temperature rise along the passage becomes a straight line or even concave as contrasted to the convex temperature line of a conventional extruder as shown in FIGURE 9. This reduces surging by eliminating the convex curve shape which is a major premise in the surging theory as set forth above.

FIGURE 11 illustrates the relationships obtained in adiabatic extrusion by changing variables.

With a conventional screw to provide an increase in pitch angle is extremely expensive because of the machining problems involved. With the present design a fixed lead can be used in machining which is a standard relatively inexpensive operation. Because of the increase in diameter along the passage and along the surfaces of revolution, this will result in a decreasing or flatter pitch or helix angle as the material advances through the extruder. The screw flights are machined onto three separate short pieces. A different lead can be used on each of the three pieces without appreciably increasing the cost of machining. The individual pieces can be replaced for interchange for special effects or for experimental effects to change the output rate and temperature. By utilizing such changes a single machine can be made suitable for extruding a wide range of formulation.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. In an apparatus for extruding a thermoplastic material,
   a barrel having an inlet and a discharge with a chamber therebetween,
   a power driven screw rotatable within the barrel chamber,
      said chamber and said screw having facing surfaces of revolution defining an annular passage extending from said inlet to said discharge in which the material is advanced and plasticated,
      said passage having a plastic working portion and a plastic metering portion in communication with said working portion, said working portion extending first in one axial direction, then in an opposite axial direction and then again in said one axial direction and increasing in diameter to increase the annular length of the passage,
   raised helical advancing members on one of said surfaces for advancing material along said working portion of the passage,
   the annular passage between said surface of revolution of said metering portion changing in diameter so that relative axial movement between the screw and barrel will change the width of the passage of said metering portion,
   and means for controllably axially relatively shifting said screw and barrel for changing the throttling of the material and changing the working of the material in said working portion of the passage.

2. In an apparatus for extruding a thermoplastic material,
   a barrel having an inlet and a discharge with a chamber therebetween,
   a power driven screw rotatable within the barrel chamber,
      said chamber and said screw having facing surfaces of revolution defining an annular passage extending from said inlet to said discharge in which the material is advanced and plasticated,
      said passage having a plastic working portion and a plastic metering portion in communication with said working portion,
      said working portion extending first in one axial direction, then in an opposite axial direction and then again in said one axial direction and increasing in diameter to increase the annular length of the passage,
   raised helical advancing members on one of said surfaces for advancing material along said working portion of the passage,
      the annular passage between said surfaces of revolution of said metering portion changing in diameter so that the relative axial movement between the screw and barrel will change the width of the passage of said metering portion,
   means for controllably axially shifting said screw for changing the throttling of the fluid material and changing the working of the material in said working portion of the passage,
   and temperature responsive means measuring the temperature of the material at said discharge and connected to said axial shifting means positioning the screw as a function of the temperature to change working of the material so that a uniform temperature material is obtained.

3. In an apparatus for extruding a thermoplastic material,
   a barrel having an inlet and a discharge with a chamber therebetween,
   a power driven screw rotatable within the barrel chamber,
      said chamber and said screw having facing surfaces of revolution defining an annular passage extending from said inlet to said discharge in which the material is advanced and plasticated,
      said passage having a plastic working portion and a plastic metering portion in communication with said working portion, said working portion extending first in one axial direction, then in an opposite axial direction and then again in said one axial direction and increasing in diameter to increase the annular length of the passage, raised helical advancing members on one of said surfaces for advancing material along said working portion of the passage, the annular passage between said surfaces of revolution of said metering portion changing in diameter so that the relatively axial movement between the screw and barrel will change the width of the passage of said metering portion, means for controllably axially shifting said screw for changing the throttling of the fluid material and changing the working of the material in said working portion of the passage, temperature responsive means measuring the temperature of the material at said discharge and connected to said axial shifting means positioning the screw as a function of the temperature to change working of the material so that a uniform temperature material is obtained, a variable speed drive for rotating said screw, and means for measuring the flow rate of material through the discharge and changing the speed of said drive so that uniform flow is obtained independent of change in the axial position of the screw.

4. In an apparatus for extruding a thermoplastic material, a barrel having an inlet and a discharge with a chamber therebetween, a power driven screw rotatable within the barrel chamber, said chamber and said screw having facing surfaces of revolution defining an annular passage extending from said inlet to said discharge in which the material is advanced and plasticated, said passage having a plastic working portion and a plastic metering portion in communication with said working portion, said working portion extending first in one axial direction, then in an opposite axial direction and then again in said one axial direction and increasing in diameter to increase the annular length of the passage, raised helical advancing members on one of said surfaces for advancing material along said working portion of the passage, the annular passage between said surfaces of revolution of said metering portion changing in diameter so that relative axial movement between the screw and barrel will change the width of the passage of said metering portion, said surfaces of said metering portion tapering axially inwardly toward the discharge end of the screw and curving inwardly providing a passage of uniform flow area along its length, and means for controllably axially relatively shifting said screw for changing the throttling of the fluid material and changing the working of the material in said working portion of the passage.

5. In an apparatus for extruding a thermoplastic material, a barrel having an inlet and a discharge with a chamber therebetween, a power driven screw rotatable within the barrel chamber, said chamber and said screw having facing surfaces of revolution defining an annular passage extending from said inlet to said discharge in which the material is advanced and plasticated, said passage having a plastic working portion and a plastic metering portion in communication with said working portion, said working portion extending first in one axial direction, then in an opposite axial direction and then again in said one axial direction and increasing in diameter to increase the annular length of the passage, raised helical advancing members on one of said surfaces for advancing material along said working portion of the passage, the annular passage between said surfaces of revolution of said metering portion changing in diameter so that relative axial movement between the screw and barrel will change the width of the passage of said metering portion, said surfaces of said metering portion tapering axially inwardly toward the discharge end of the screw and curving inwardly providing a passage of uniform flow area along its length with the surfaces of the metering portion shaped in accordance with the relationship:

$$y = \frac{x}{2}\sqrt{\frac{4\pi^2 k^2 x^2 - 1}{A^2}} - \frac{A}{4\pi k}\log_e\left[\frac{4\pi k x}{A} + \sqrt{\frac{4\pi^2 k^2 x^2 - 1}{A^2}}\right]$$

wherein:

$y$ is the vertical coordinate along the screw axis, $x$ is the horizontal coordinate radially outwardly from the axis, $k$ is distance screw must move to close valve (varies), $A$ is area of opening. This is an annulus which varies in shape but has constant area for any chosen $k$; $A = 2\pi w x$ where $w$ is the width of the space between the surfaces of the barrel and screw), $\log_e$ = natural log with base $e$, and means for controllably axially relatively shifting said screw for changing the throttling of the fluid material and changing the working of the material in said working portion of the passage.

6. In an apparatus for extruding a thermoplastic material, a barrel having an inlet and a discharge with a chamber therebetween, a power driven screw rotatable within the barrel chamber, said chamber and said screw having facing surfaces of revolution defining an annular passage extending from said inlet to said discharge in which the material is advanced and plasticated, said passage having a plastic working portion and a plastic metering portion in communication with said working portion, said working portion extending first in one axial direction, then in an opposite axial direction and then again in said one axial direction and increasing in diameter to increase the annular length of the passage, raised helical advancing members on one of said surfaces for advancing material along said working portion of the passage, the annular passage between said surfaces of revolution of said metering portion changing in diameter so that relative axial movement between the screw and barrel will change the width of the passage of said metering portion, means for controllably axially relatively shifting said screw and barrel for changing the throttling of the material and changing the working of the material in said working portion of the passage, and a variable opening valve in said discharge for throttling the flow of material through said passage independent of the axial position of said screw.

7. In an apparatus for extruding a thermoplastic material, a barrel having an inlet and a discharge with a chamber therebetween, a power driven screw rotatable within the barrel chamber, said chamber and said screw having facing surfaces of revolution defining an annular passage extending from said inlet to said discharge in which the material is advanced and plasticated, said passage having a plastic working portion and a plastic metering portion in communication with said working portion, screw threads on at least one of the surfaces for the full length of the working portion of the passage for advancing and plasticating the material, said surfaces of the working portion of the passage shaped so that the passage extends in a first axial direction, axially doubles back on itself to extend in the opposite direction, and then again doubles back on itself to extend in said first axial direction with the passage continually increasing in diameter to increase the relative circumferential rotational speed of the surfaces.

References Cited by the Examiner

UNITED STATES PATENTS

| | | | |
|---|---|---|---|
| 2,688,154 | 9/54 | Huckfeldt | 18—14 |
| 2,944,286 | 7/60 | Kullgren et al. | 18—12 |
| 2,948,922 | 8/60 | Meskat et al. | 18—12 |
| 3,057,009 | 10/62 | Lipski | 18—12 |

FOREIGN PATENTS

| | | |
|---|---|---|
| 1,013,865 | 8/57 | Germany. |
| 1,092,184 | 11/60 | Germany. |

WILLIAM J. STEPHENSON, *Primary Examiner.*

MICHAEL V. BRINDISI, *Examiner.*